Jan. 26, 1960 R. A. MATHEISEL ET AL 2,922,602
LAUNCHER
Filed July 18, 1956 5 Sheets-Sheet 1

INVENTORS
RUDOLPH A. MATHEISEL
CONRAD H. COOKE
BY
Julian C. Renfro
ATTORNEY

Jan. 26, 1960   R. A. MATHEISEL ET AL   2,922,602
LAUNCHER

Filed July 18, 1956   5 Sheets-Sheet 3

INVENTORS
RUDOLPH A. MATHEISEL
CONRAD H. COOKE
BY
ATTORNEY

INVENTORS
RUDOLPH A. MATHEISEL
CONRAD H. COOKE
BY
*Julian C. Renfro*
ATTORNEY

Jan. 26, 1960     R. A. MATHEISEL ET AL     2,922,602

LAUNCHER

Filed July 18, 1956                           5 Sheets-Sheet 5

INVENTORS
RUDOLPH A. MATHEISEL
BY CONRAD H. COOKE

ATTORNEY

United States Patent Office 2,922,602
Patented Jan. 26, 1960

2,922,602
LAUNCHER

Rudolph A. Matheisel, Baltimore, and Conrad H. Cooke, Linhigh, Md., assignors to The Martin Company, a corporation of Maryland Application July 18, 1956, Serial No. 598,660

16 Claims. (Cl. 244—63)

The present invention relates to apparatus useful as a multi-purpose device for transporting a missile or aircraft to an operational site, and launching the missile or aircraft therefrom at such site. Apparatus according to this invention is additionally useful for the assembling, testing, and storing of such a missile or aircraft, and has particular applicability for, but is not restricted to, uses including the transporting and launching of jet aircraft.

The new apparatus is a combined transporter and zero-length launcher adapted to support an aircraft, such as a "Matador" pilotless bomber, for example, whereby the aircraft may be readily transported to a launching site, set up in the desired position, and launched, all with a practical minimum of crew and equipment, and with substantial speed and efficiency.

In a zero-length launcher, the aircraft is supported in an upwardly inclined attitude, and is provided with a booster rocket motor, the thrust of which is directed upwardly and forwardly, through the center of gravity of the aircraft. With the jet motor of the aircraft operating at full speed, the rocket motor is started, and when a predetermined thrust is generated the aircraft is released from the launcher. The combined thrust of the jet and rocket motors moves the aircraft upwardly and forwardly off of the launcher, and accelerates the aircraft to flying speed in a brief interval of time. After a few seconds, the rocket motor is jettisoned, and the aircraft continues flight under its own power. One of the primary advantages of the zero-length launching technique is that the aircraft requires no guidance during launching.

United States Patent No. 2,729,406, to Orville J. Bush, owned by the assignee of this application, describes and claims the apparatus for carrying out the zero-length launching technique. The present invention represents an improvement over the Bush apparatus in that the new launcher-transporter is of substantially less weight, and has greater versatility.

Basically, the present invention provides a novel and improved transporter and zero-length launching combine, which is sufficiently light in weight for transport over all roads and terrain, and by aircraft. It is compact and of low profile to provide the required clearance of ordinary overpasses or to permit loading in the interior of a cargo plane, all while supporting an aircraft. The invention also provides a novel launcher-transporter combine that may be inexpensively produced, making it economically and otherwise practicable to provide a separate transporter-launcher for each aircraft. The aircraft may thus be stored on the launchers, in readiness for use. At desired times, the launcher may be connected to towing vehicles, or loaded into cargo planes, for rapid transport to a launching site.

When the launcher is at the site, it may be quickly erected from a low-profile or contracted position to an extended position supporting the aircraft in a proper launching attitude and in elevated relation to the ground surface. The launcher carries actuator means adapted to be supplied with power from an auxiliary vehicle. But for emergency conditions, where contact cannot be made with the auxiliary vehicle, the launcher carries a lightweight, manually operable, emergency power system enabling the launcher to be erected.

More specifically, the invention provides a launcher-transporter combine comprising a bed for mounting and supporting an aircraft or missile, and pairs of legs adapted to be positioned either in parallel relation to the bed or in angular relation thereto. The apparatus includes actuator means operative to position the legs in either the parallel or the angular relation, as may be required for its immediate use.

When the structure is in its folded or contracted position, in which the legs and bed are in parallel relation, it is relatively compact, at least sufficiently so as to permit it to be loaded together with its missile or aircraft within a conventional cargo plane. And since the apparatus structure requires a minimum number of parts, which may be light in weight, the loaded launcher-transporter combine, with its missile or aircraft, has the additional advantage of adding but a relatively small additional weight load for air transport.

The transporter-launcher combine may also be used, when in its folded position, as a pallet or storage device for a missile or aircraft. And, in accordance with the invention, each of the legs is provided with means at its outer end for mounting a wheel. In this way, the complete apparatus, loaded with a missile or aircraft, may be towed to a launching site. In addition, the aircraft supporting bed may be removed bodily from the launcher frame and used as a pallet for storage and/or shipping of an aircraft.

In the preferred forms of the invention the legs are pivoted on a frame, which, in turn, supports the aircraft supporting bed. Moving the legs into angular relation with the frame causes the bed and frame to be elevated, so that the missile or aircraft is supported in an appropriate position and at the proper attitude for launching.

The new launcher-transporter combine is advantageous for towing a missile or aircraft to a launching site, in that the legs and bed frame structure have inherent resilience, to assist in isolating shocks and strains from the missile or aircraft. And, additionally, it is possible to ford small streams, for example, by moving the legs into angular relation to the bed frame, thereby raising the aircraft or missile to avoid wetting.

The above and other features and advantages of the invention will become apparent upon reference to the following detailed description and accompanying drawings, in which.

Referring initially to Figs. 1–7, the numeral 10 designates an aircraft, which may be a conventional jet-powered pilotless aircraft, for example, having wings 10a, a warhead 10b, and an attached auxiliary booster rocket 10c. The aircraft 10 is supported upon the new launcher-transporter, which includes a bed 11, formed of suitable structural members, and having a cradle portion 11' at one end for supporting the tail section of the aircraft. The forward portion of the aircraft 10 is supported by spaced pivotally mounted arms 12, having spherical tip portions 13 adapted to be received in complementary recesses 14 in the sides of the aircraft. The supporting arms 12 are advantageously in the form of hydraulic cylinders, so that the length thereof may be readily adjusted.

The bed or skid 11 is bolted to and supported by a pair of longitudinally extending frame members 15, which in turn are supported by pairs of legs 16, 17. In the first illustrated embodiment of the invention, the legs 16 are secured near the forward ends of the frame members 15, by means of suitable pins or bolts 16', and extend rearwardly, mounting wheels 18 at their free ends. The other pair of legs 17 is secured near the rearward end of the frame 15, by means of pins 19 slidably received in elongated slots 20. The forwardly extending legs 17 are joined at their forward ends, and mount a universal swivel connector 21. The connector 21 mounts a cross bar or yoke 22, at the opposite ends of which are wheels 23. Secured to and extending forwardly from the yoke 22 is a draw bar 24, which is employed in towing the launcher-transporter from place to place. The swivel connector 21 permits tilting of the yoke 22 and front wheels 23 with respect to the frame 15 and bed 11, and is therefore of advantage for travel over uneven roads or terrains.

In the preferred form of the invention, the bed 11 is readily removable from the frame 15. The bed may therefore be used as a skid or pallet for the aircraft 10, where desired, and may also be used as a frame to support the aircraft during assembly. Moreover, the bed 11 may take different forms, suitable for supporting aircraft of various types. In any of its forms, the bed 11 is mountable on and removable from the frame 15, so that the same basic launcher-transporter may be used in connection with a number of different aircraft.

In accordance with the teachings of the invention, the forwardly extending legs 17 are engaged with actuators 25, mounted on the frame 15 by means of brackets 26. The actuators 25 may be hydraulic or pneumatic cylinders, or suitable electro-mechanical devices, such as motorized screw-jacks, for example. The illustrated actuators 25 are hydraulic cylinders mounted in longitudinally disposed relation on the frame 15 and adapted to move the upper ends of the legs 17 longitudinally of the frame, the legs 17 being guided in such movements by the pins 19 and slots 20.

Figure 1:
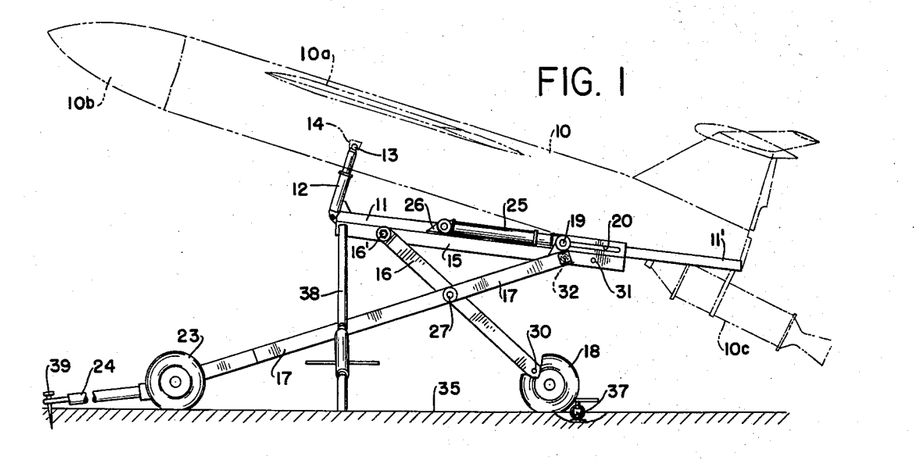
Fig. 1 is a side elevation of a first form of the new launcher-transporter combine, illustrating the apparatus in aircraft-launching position.

As shown best in Fig. 1, the legs 16 are pivotally connected to the legs 17, by means of suitable bolts or pins 27, so that pivoting movement of either pair of legs will cause a related pivoting movement of the other pair. The arrangement is such that retraction of the actuators 25, for example, will act through the upper portions of legs 17 and through the pins 27 to pivot the rearwardly extending legs 16 away from the frame members 15. Simultaneously, the legs 17 are also pivoted away from the frame members and shifted forwardly, as the pins 19 slide forwardly in the slots 20.

Figure 2:
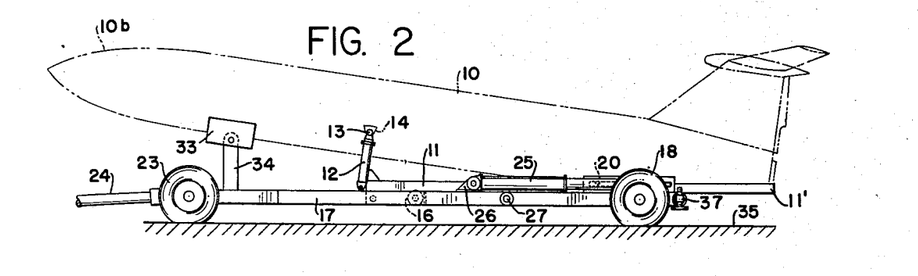
Fig. 2 is a side elevation of the launcher-transporter combine of Fig. 1, with the apparatus in position for transporting an aircraft.

Normally, the parts of the apparatus will be positioned in the manner indicated in Fig. 2, wherein the legs 16, 17 are contracted or folded in aligned relation. The legs are secured in this relation by means of pins 28, which are operated by solenoids 32. As seen in Fig. 5, the pins 28 can be inserted in openings 29—31, the legs 16, 17 and frame members 15, when these members are aligned. With the parts thus locked together, the legs 16, 17 form active structural parts of a transporting undercarriage for the aircraft 10. The brackets 26 also have portions extending over the tops of the legs 16, 17, as is apparent in Fig. 4, and these portions act as stops, providing additional support for the legs when the latter are in contracted positions. The brackets 26 may also support the legs in contracted positions independently of the pins 28, as in cases where the pins are withdrawn immediately prior to elevating the launcher.

Preferably, the pins 28 are carried by the movable members of solenoids 32 secured to the legs 17, so that the pins may be readily moved into locking position, when the openings 29—31 are properly aligned, or retracted to permit the apparatus to be erected into a launcher. Each pin 28 carries a locking element 28a at its inner end, so that when the pins are in locking position, accidental withdrawal is prevented. Each pin 28 is also provided with a manually engageable handle portion 28b which projects outwardly from the housing of solenoid 32, as shown in Fig. 5. The handle portions 28b permit the pins 28 to be manually manipulated in the event of failure of the solenoids.

When the apparatus is locked in a contracted position, to form a mobile undercarriage, the aircraft 10 is supported in upwardly inclined relation by means of the arms 12 and by means of a cradle 33 and adjustable support 34. The arms 12 are locked in their erect positions to provide firm support for the front portion of the aircraft. The wings 10a of the aircraft are generally removed or folded, and the warhead 10b may also be removed. With the aircraft and undercarriage in this condition, the tow bar 24 may be attached to a truck or other vehicle for towing to any desired launching site.

It is contemplated that it will be necessary upon occasion to tow the aircraft and undercarriage over uneven roads or terrain to reach a desired launching site, and for this reason the legs 16, 17 and other structural elements of the launcher-transporter will be formed of lightweight resilient structural members which will twist and bend slightly, where necessary, to isolate road shocks and strains from the aircraft.

When the apparatus is located at the desired launching site, the aircraft 10 may be moved into launching position by withdrawing the pins 28 and energizing the actuators 25 to retract. This causes the pairs of legs 16, 17 to simultaneously pivot away from the bed frame 15 and bed 11, causing the bed to be raised from the supporting surface 35. The lengths of the respective legs 16, 17, and the location of the points of pivotal interconnection with the pins 27 are such that when the legs 16, 17 are pivoted away from the bed 11 the forward end of the bed is tilted upwardly. This increases the angle at which the aircraft 10 is supported for launching; and this may be further augmented by energizing the actuators forming the supporting arms 12, so that the length of the arms is increased.

Figure 4:
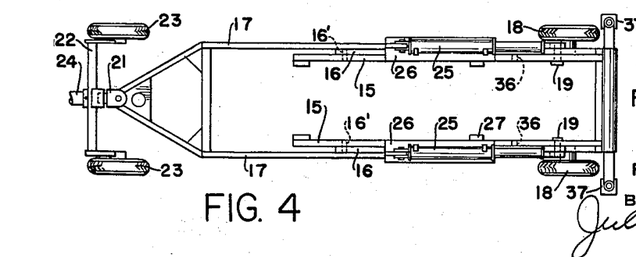
Fig. 4 is a top plan view of the launcher-transporter combine of Fig. 1, with the aircraft supporting bed removed.
Figure 5:
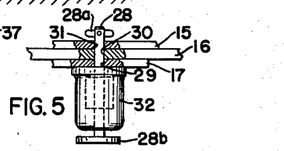
Fig. 5 is an enlarged fragmentary view of the apparatus of Fig. 1, with parts broken away, showing means for securing parts of the apparatus together in a fixed position.
Figure 6:
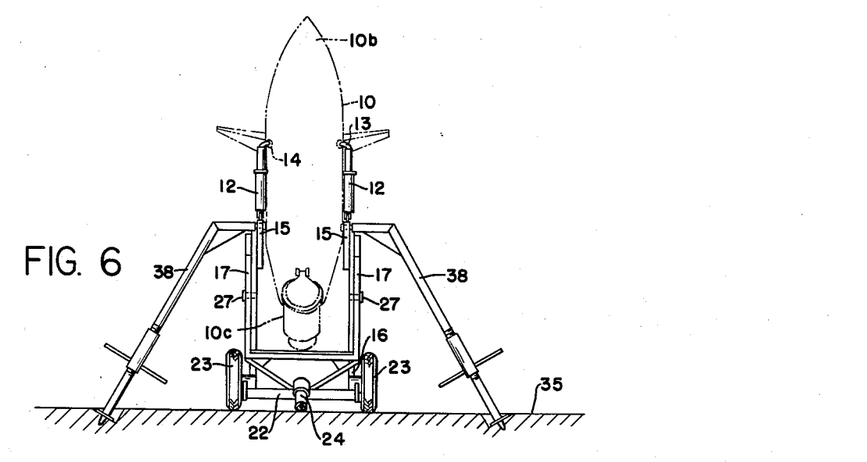
Fig. 6 is a front elevation of the launcher-transporter combine of Fig. 1 in aircraft launching position.

When the apparatus has been erected to full height, to form a launcher for the aircraft 10, the solenoids 32 are again actuated to insert the pins 28 into aligned openings in the frame 15 and legs 17, the frame openings being indicated at 36 in Fig. 4. This locks the apparatus in erected position; and permits the main actuators 25 to be relieved.

It is contemplated that the necessary pressure fluid system for the actuators 25 and 12 will be carried by a separate vehicle, which may move from place to place, to service a number of launchers. For this purpose, each launcher has a fluid system, usually hydraulic, including a pair of quick-detachable coupling devices 100, 101 (see Fig. 7) by means of which the fluid system of the launcher may be quickly coupled with an auxiliary power supply vehicle.

Figure 7:
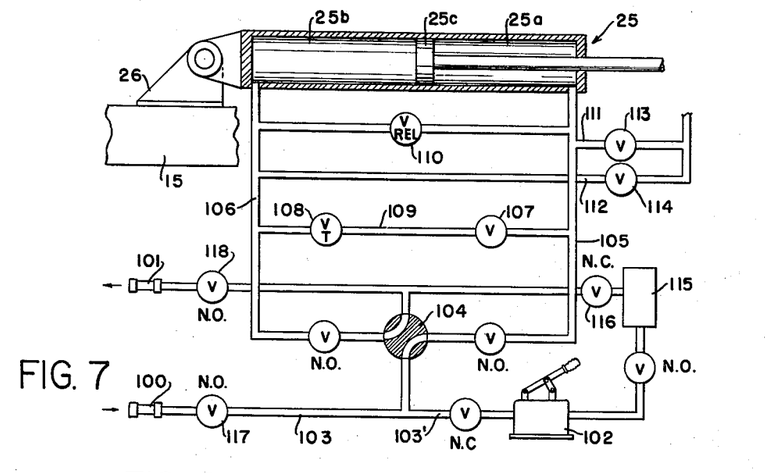
Fig. 7 is a simplified schematic representation of a hydraulic circuit arrangement incorporated in the new launcher-transporter combine, including emergency manually operable means.

When the power supply vehicle is properly coupled with the launcher, hydraulic fluid enters through coupling device 100 and flows through a conduit 103 to a selector valve 104. By appropriate manipulation of the selector valve, the incoming fluid can be directed through a conduit 105 to the rod ends 25a of actuating cylinders 25, to cause the launcher to erect, or through a conduit 106 to the head ends 25b of the actuating cylinders, to cause the launcher to be lowered. By virtue of the illustrated arrangement, as the pistons 25c travel toward the head ends of the cylinders, i.e., in a launcher-erecting direction, any fluid contained in the head ends of the cylinders flows through conduit 106, through the selector valve 104, and then out through the coupling device 101, back to the hydraulic pressure supply vehicle. Usually, the weight involved is sufficient that the launcher can be lowered without the use of high pressure fluid. In such cases, lowering is accomplished by opening a valve 107, and adjusting a throttling valve 108 to control the rate of fluid flow from the cylinders 25, through conduit 109, into conduit 106. However, the launcher can be pumped into the lowered position by moving the selector valve so that fluid flows from the inlet coupling 100 into the conduit 106.

A pressure relief valve 110 is provided between conduits 105, 106 to form a high pressure by-pass between the rod and head ends 25a, 25b of the cylinders 25.

The hydraulic circuit is also provided with various shut-off valves to facilitate replacement of components, and for other purposes. The designation N.O. is applied to valves of this type which are normally open, while the designation N.C. is applied to normally closed valves.

Additional lines 111, 112 lead from conduits 105, 106 to cylinders 12. Suitable valves 113, 114 are provided in the lines 111, 112 to effect the actuation of the cylinders 12 in the manner desired.

In some instances, and particularly under pressing combat conditions, it may be impossible or impractical for the power supply vehicle to reach the launcher, at a tactically advantageous time, if at all. Accordingly, each launcher has its own emergency power supply system in the form of a hydraulic hand pump 102 mounted in a suitably accessible position on the frame 15. The output of the pump 102 may be selectively connected through a conduit 103′, selector valve 104 and conduit 105 to the rod ends of elevating actuators 25, and through other conduits (111, 112) to the appropriate ends of cylinders 12. The inlet to the pump is connected to a fluid reservoir 115. The reservoir 115 is in turn connected through a normally closed shut-off valve 116 to the selector valve 104. When the shut-off valve 116 is opened, and the selector valve 104 is turned to erecting position, a desirable amount of fluid from the head ends 25b of actuators 25 may flow into the reservoir, through conduit 106.

To elevate the launcher with the emergency system, normally open valves 117, 118, in series with couplers 100, 101 are closed, and fluid is forced into the rod ends of cylinders 25 by the hand pump 102. An adequate supply of fluid is provided by the reservoir 115, which receives fluid from the head ends of the cylinders 25 during the erecting operation.

To stabilize the apparatus in aircraft-launching position, the rearwardly extending legs 16 are provided at their free ends with adjustable level and jack devices 37 which may be brought into position to engage the supporting surface 35. In addition, removable adjustable outrigger braces 38 (Figs. 1 and 6) are provided, which may be connected to the forward portion of the frame 15 and adjusted to engage the supporting surface 35 outwardly of the sides of the apparatus. It is also desirable, in most cases, to secure the drawbar 24 to the supporting surface 35, by means of a suitable stake 39, for example, so that the launcher will remain stationary during launching of the aircraft 10. The launcher may also be held in place during launching by means of sandbags placed against the wheels of the launcher. The sandbags may be used in addition to or in place of the stake 39, as may be desired.

After the launcher-transporter is erected, and the aircraft is readied for flight, the launching is effected in accordance with the Bush Patent No. 2,729,406. To this end, the arms 12 are first freed for pivoting movement. With the jet engine operating at full throttle, the booster rocket 10c is fired. The very substantial thrust created by the rocket motor causes a shear pin restraining the aircraft to fail, allowing the aircraft to become airborne at a suitable flying speed.

In some cases, it may be desirable to provide a shield or covering of asbestos (not shown) to protect the rear wheels 18 from the heat of the booster rocket gases.

After the aircraft has been launched, the launcher may be contracted by withdrawing the locking pins 28 and opening a valve 107 in the fluid system. Fluid is thus permitted to flow out of the rod ends of actuators 25, through a conduit 109 and throttle valve 108, and into the head ends of the actuators 25, which act as reservoir means for the fluid. The launcher is thus contracted at a controlled rate to its folded position, after which it may be towed to a depot for reloading. It is advantageous to provide for the contraction of the launcher by manually operable means and independently of the separate power supply vehicle, as in the present case, since it is unnecessary to detain the auxiliary vehicle until after the launching has been completed, or to require its return at a later time.

One of the most important aspects of the present invention resides in the fact that the launcher-transporter combine, with an aircraft loaded thereon, may be placed on board a conventional cargo plane for air delivery to an operational area. To this end, the launcher-transporter must be very light in weight, and this is realized through the use of lightweight structural components throughout, and through the novel arrangement wherein the legs 16, 17 serve alternately as supports for the launcher and as active elements of the undercarriage.

Figure 3:
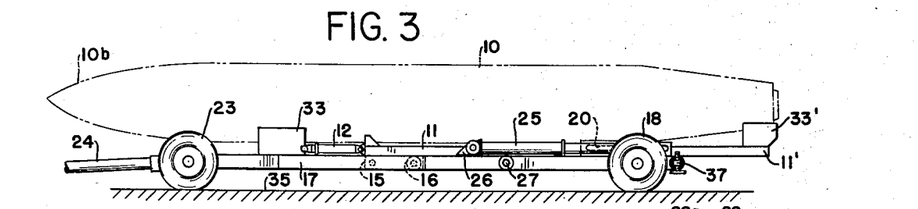
Fig. 3 is a side elevation of the launcher-transporter combine of Fig. 1, in position to support an aircraft for storage, service, or inspection.

To ready the undercarriage and aircraft for loading onto a cargo aircraft, the wings, tail section and warhead of the aircraft 10 are removed, the arms 12 are disengaged from the sockets 14 at the sides of the aircraft 10, and the front portion of the aircraft is supported on the cradle 33 resting directly upon the bed 11. An auxiliary cradle 33′ is also employed to support the tail section of the aircraft 10, as shown in Fig. 3. The assembly, in this position, occupies a practical minimum of space, and may be received within the cargo space of certain conventional aircraft.

For convenient storage of the aircraft 10, prior to use, the launcher-transporter may be employed in the manner indicated in Fig. 3, wherein the aircraft is supported in a horizontal position. It will be observed in Fig. 3 that most of the aircraft is easily accessible, facilitating inspection and repair of the motor and electronic equipment. When the aircraft is to be stored for long periods of time, the wheels 18, 23 may be removed, and the undercarriage frame supported on suitable jacks (not shown) secured to the legs 16, 17 to avoid excessive depreciation of the tires.

Figure 8:
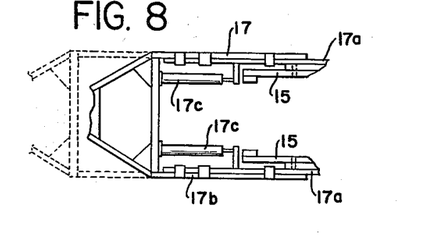
Fig. 8 is a fragmentary top plan view of a slightly modified form of the launcher-transporter combine of Fig. 1, with the bed removed.

Fig. 8 illustrates a slightly modified form of the launcher-transporter of Figs. 1–7, wherein means are provided for adjusting the length of the forward legs. Thus, the forward legs are comprised of rear parts 17a, pivoted on the frame 15 in the described manner, and forward parts 17b which are supported by and slidably engaged with the rear parts 17a. Suitable actuators 17c are provided which connect the leg parts 17a and 17b whereby, upon appropriate energization of the actuators, the total length of the leg assembly 17a—17b may be altered.

Generally, when the launcher is in a contracted position, the movable forward leg parts 17b will be retracted, in the position shown in full lines in Fig. 8. After the launcher is elevated or erected, the actuators 17c are extended, to increase the length of the leg assembly 17a—17b. As will be readily understood, the increased length of the forward leg assembly 17a—17b improves the stabilization of the launcher during the launching operation.

In the embodiment of Figs. 9–13, the launcher-transporter combine has a bed 40, with arms 41 pivotally mounted at its forward end, supporting an aircraft 42, and having spaced longitudinally extending bed frame members 43 secured at each side. At the rear portion of the frame members 43 are brackets 44, to which are pivotally mounted forwardly extending legs 45. The legs 45 have wheels 46 at their forward ends, mounted much in the same manner as illustrated in Fig. 4. Rearwardly extending legs 47 are pivoted to the frame members 43, near the forward end of the bed, by bolts 48, and mount wheels 49 at their free ends.

Figure 9:
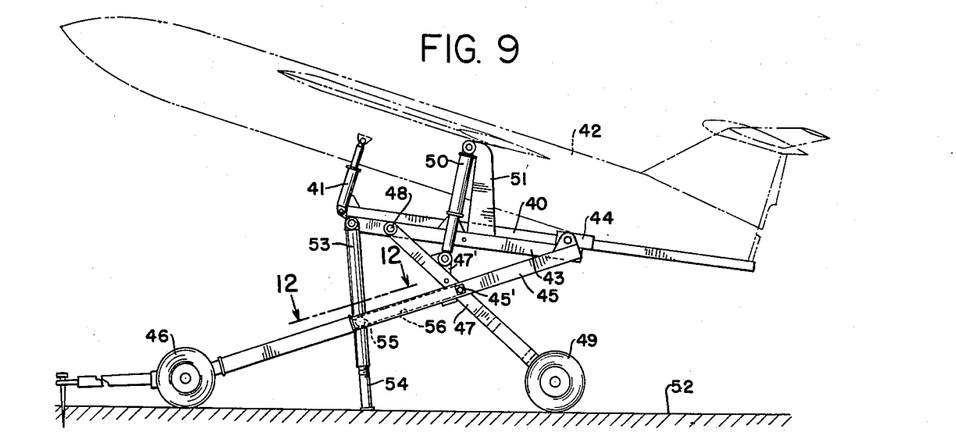
Fig. 9 is a side elevation of a second embodiment of the new launcher-transporter combine, illustrating the apparatus in aircraft launching position.

The rearwardly extending legs 47 are also connected to the frame members 43 by means of a pair of hydraulic actuators 50 supported in generally vertical relation by means of brackets 51. When the actuators 50 are energized to extend, the rearwardly extending legs 47 are pivoted away from the bed 40, causing the bed to be raised away from the supporting surface 52.

Figure 10:
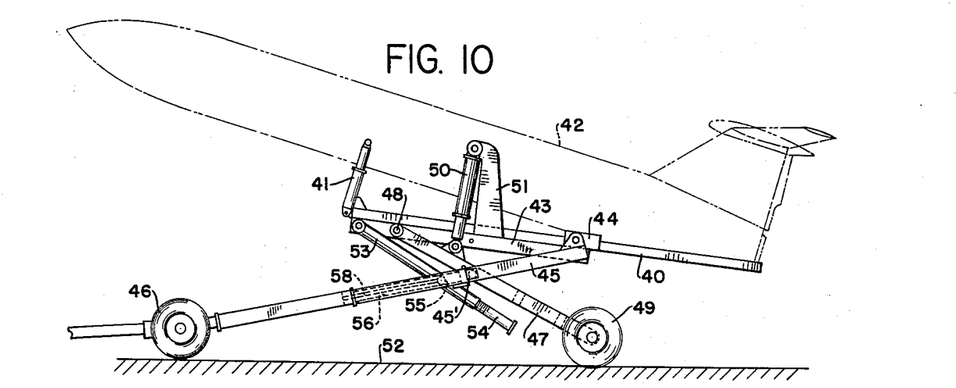
Fig. 10 is a side elevation of the launcher transporter of Fig. 9, illustrating the apparatus in a partially elevated position.

At the forward end of the frame members 43 are pivoted a pair of brace members 53, having adjustable end portions 54, and carrying rollers 55 intermediate their ends. The rollers 55 are received in channels or grooves 56 in the forwardly extending legs 45, as indicated in Figs. 9 and 10. The rollers 55 are mounted by means of axles 57 (see Fig. 12), to which are connected the operating rods 58 of hydraulic actuators 59. The actuators 59 are mounted on the forward portions of the legs 45, so that the rollers 55 may be moved longitudinally of the legs 45, in the channels 56. It will thus be understood that the forwardly extending legs 45 may be pivoted with respect to the bed 40 by energizing the actuators 59 in one direction or the other, to move the rollers 55 in their respective channels 56.

Figure 11:
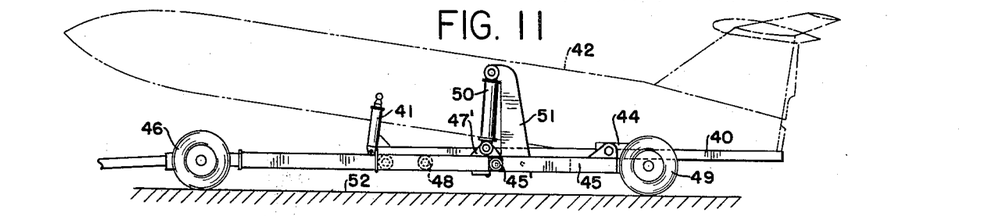
Fig. 11 is a side elevation of the apparatus of Fig. 9 in a contracted position for transporting an aircraft.
Figure 12:
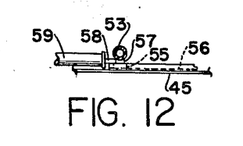
Fig. 12 is a fragmentary cross-sectional view taken along line 12—12 of Fig. 9.
Figure 13:
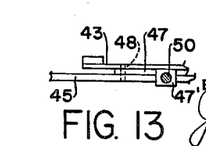
Fig. 13 is a fragmentary top plan view, partly in section, of the launcher-transporter of Fig. 9 with the aircraft supporting bed removed.

When the launcher-transporter of Figs. 9–13 is in condition for the storage or transportation of the aircraft 42, the legs 45 and 47 are horizontally positioned and locked, as in Fig. 11, lying in a plane close to the supporting surface, and supporting the aircraft in a low position. To erect the carriage into launching position, the actuators 50 are energized to extend. This forces the rearwardly extending legs 47 to pivot away from the bed 40, tending to raise the latter. Upon the initial movement of the legs 47 away from the bed 40, brackets 47' on the legs 47 (see Fig. 13) engage the forwardly extending legs 45 to move the latter away from the bed slightly, so that the legs 45 are moved out of alignment with the braces 53. When this occurs, the actuators 59 are energized to retract, so that the braces 53 are pivoted downwardly, forcing the legs 45 away from the bed and raising the bed from the supporting surface 52. An intermediate stage of the erection of the apparatus is illustrated in Fig. 10, while Fig. 9 illustrates the apparatus fully erected, as a launcher.

In order to lock the apparatus in position, either as a launcher or as a transporter, solenoid-actuated pins 45' are provided on the forwardly extending legs 45. The pins 45' are equivalent to those illustrated in Fig. 5 and are arranged to be inserted, either manually, or by the solenoid, in aligned openings in the legs 45 and 47 and frame members 43, when the apparatus is contracted for use as a transporter, or to be inserted in aligned openings in the legs 45 and 47 when the apparatus is erected for use as a launcher. Suitable mechanical stops (not shown) are provided for limiting the pivoting movement of the legs 45 and 47 to facilitate insertion of the frame locking pins 45'.

Figure 14:
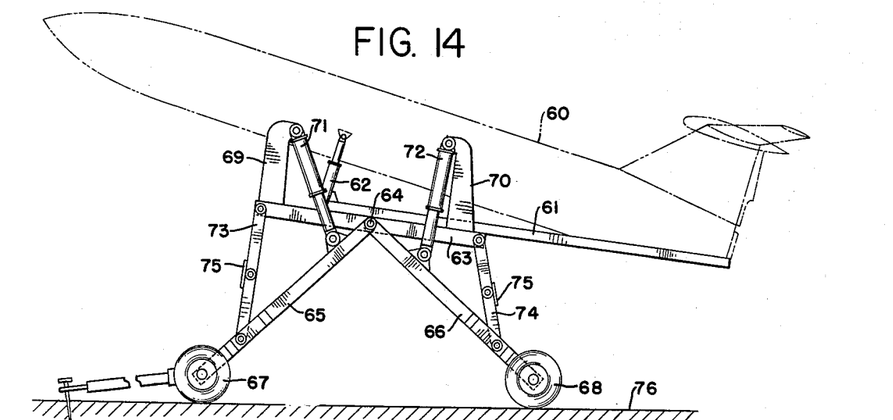
Figs. 14 and 15 are side elevations of a third embodiment of the launcher-transporter combine, illustrating the apparatus in position for launching and transporting an aircraft.
Figure 15:
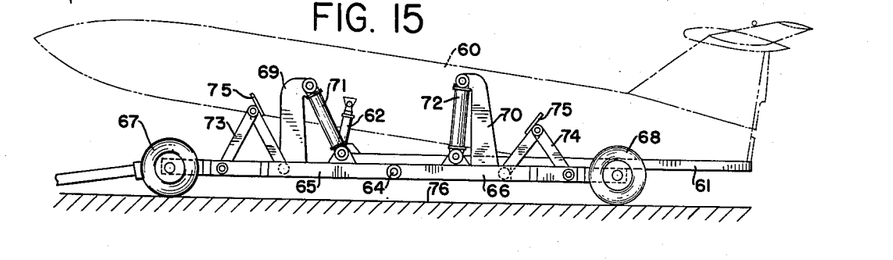

In the embodiment of Figs. 14 and 15, an aircraft 60 is supported on a bed 61 having pivotal supporting arms 62 at its forward end and longitudinally extending frame members 63 at each side. Near the center portion of each frame member 63 is a bolt 64, which extends outwardly of the frame member and serves to pivotally mount a pair of legs 65, 66. The legs 65 are pivoted at their rearward ends by the bolts 64 and extend forwardly, mounting wheels 67 at their free ends. The legs 66 are connected at their forward ends by the bolts 64, and extend in a rearward direction, mounting wheels 68 at their free ends. The bolts 64 thus define a common axis, about which all of the legs 65, 66 pivot.

At the opposite ends of the frame members 63 there are mounted upwardly extending pairs of brackets 69, 70 mounting actuators 71, 72, respectively. The front actuators 71 extend downwardly and are connected to the forwardly extending legs 65, while the rear actuators 72 are connected to the rearwardly extending legs 66. The arrangement is such that when the actuators 71, 72 are energized, the legs 65, 66 will be pivoted with respect to the aircraft supporting bed 61.

To support the apparatus in elevated or erected position, as a launcher, pairs of jointed braces 73, 74 connect the frame members 63 with the front and rear legs 65, 66, respectively, near the free ends thereof. The braces 73, 74 include means such as stop plate and latch devices 75 for locking the braces in aligned positions, so that the fully elevated launcher is self-supporting independently of the actuators 71, 72.

Fig. 15 shows the apparatus in contracted position, forming an undercarriage or transporter, the legs 65, 66 being horizontally disposed and being aligned with the frame members 63. The aircraft supporting bed 61 is held in horizontal position close to the supporting surface 76. When the apparatus is in its contracted position, as an undercarriage, the braces 73, 74 project upwardly alongside the aircraft 60.

To support the legs 65, 66 when the apparatus is in its contracted position, the actuators 71, 72 may be arranged to close solid, as indicated in Fig. 15, or a small quantity of fluid may be trapped in the actuators. Alternately, a plurality of solenoid actuated pins, not shown, of the type illustrated in Fig. 5, may be provided. Other equivalent arrangements may be employed where desired.

At the launching site, the actuators 71, 72 are simultaneously energized to move in an extending direction. This pivots the legs 65, 66 away from the bed 61 causing the latter to be raised into the position shown in Fig. 14. The relative proportions of the legs 65, 66 and braces 73, 74 are such that when the braces are brought into aligned or bracing position, frame members 63 and bed 61 will be tilted upwardly and forwardly at a slight angle, as is desired.

Figure 16:
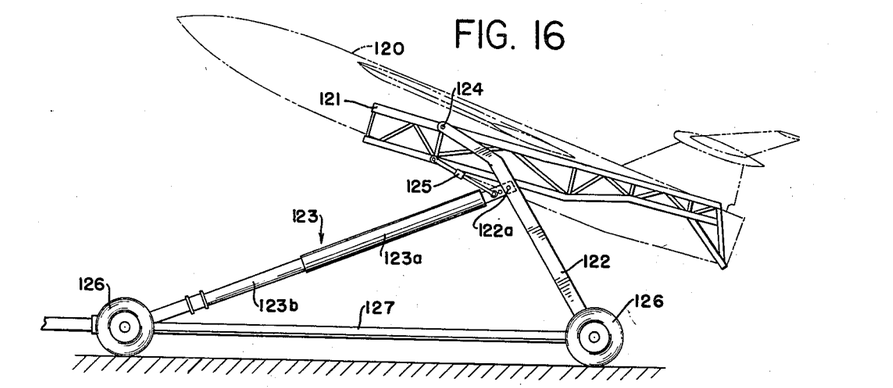
Fig. 16 is a side elevation of a fourth embodiment of our launcher-transporter combine, illustrating the apparatus in aircraft launching position.

In the apparatus shown in Fig. 16, the aircraft 120 is supported upon a bed 121 formed of lightweight structural members. The bed 121 is supported by pairs of legs 122 and 123. In the illustrated apparatus, the rearwardly extending legs 122 are pivotally connected to the bed, as at 124. The forwardly extending legs 123, however, are not connected directly to the bed 121, but are pivoted to the legs 122, near the upper ends thereof, as at 122a. The bed 121 is stabilized by adjustable links 125, which tie the bed to the front legs 123. Both pairs of legs mount wheels 126, in the usual manner.

Extending between the free ends of the legs 122, 123 are members 127, which hold the ends of the legs at a fixed separation. The members 127 are preferably lightweight rigid structural members.

The forwardly extending legs 123, of the apparatus of Fig. 16, are preferably of tubular form and are comprised of telescoping sections 123a, 123b. In the illustrated apparatus, the telescoping legs 123 are made in the form of elongated hydraulic cylinders, and by appropriate application of hydraulic fluid the legs may be caused to extend or retract.

Since the spacing of the free ends of the legs 122, 123 is fixed by the members 127, extension or retraction of the forward legs 123 will cause the back legs 122 to pivot about the axis of the rear wheels 126. Thus, when the legs 123 are extended, the legs 122 pivot upwardly, carrying the bed 121 upwardly into aircraft launching position. The links 125 stabilize the bed, and cause it to tilt upwardly somewhat, so that the aircraft is held at the proper attitude for launching. The tilting of the bed 121 may be adjusted by changing the length of the adjustable links 125 so that any aircraft may be supported at the proper attitude for launching. The links 125 are normally adjusted prior to erecting the launcher.

When the legs 123 are retracted, they assume a near-horizontal position, along with the legs 122 and the bed 121 is lowered into a crouched position, suitable for transporting the aircraft. As the bed is lowered, the links 125 draw it into a substantially horizontal position.

Figure 17:
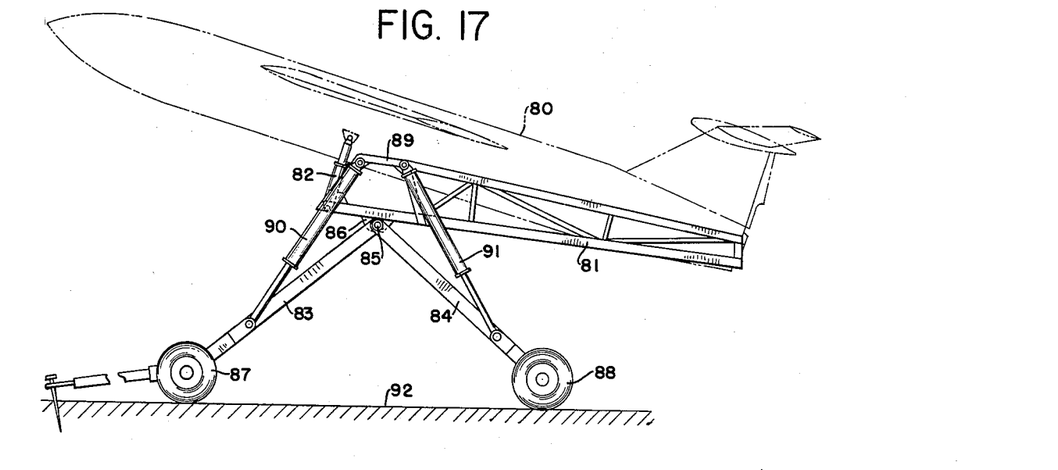
Figs. 17–19 are side elevations of a fifth embodiment of the new launcher-transporter combine, illustrating the apparatus in respective positions for the launching, transporting, and servicing of an aircraft.
Figure 18:
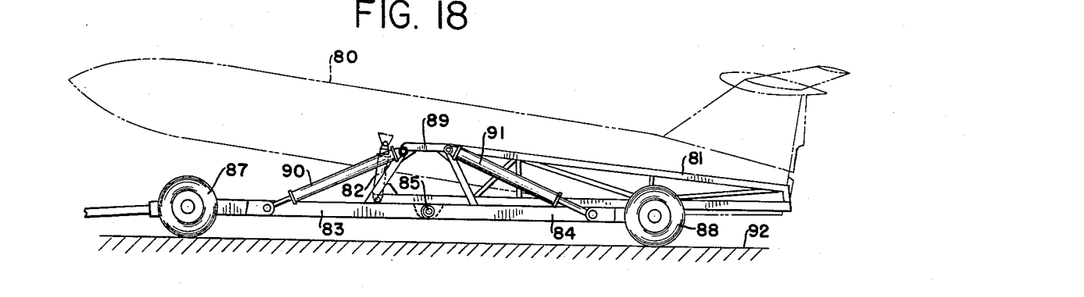
Figure 19:
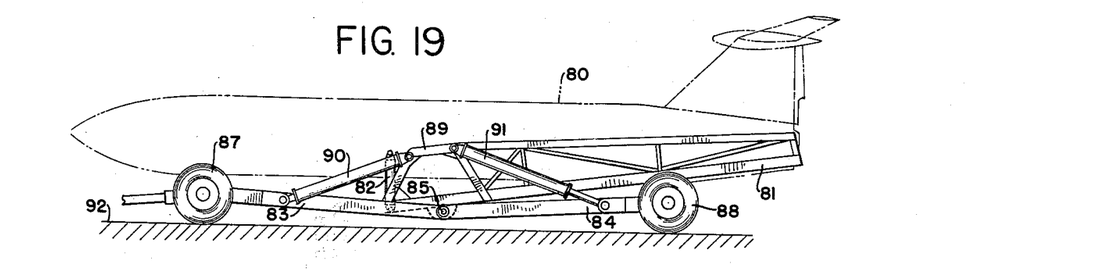

In the embodiment of Figs. 17–19, an aircraft 80 is supported on a bed 81 having pivotal supporting arms 82 at its forward end, and mounting pairs of forwardly and rearwardly extending legs 83, 84. The legs 83, 84 are mounted on a common axis by means of bolts 85 secured to downwardly extending brackets 86. Pairs of wheels 87, 88 are carried at the free ends of the legs 83, 84, respectively.

At the sides of the bed 81 are trusses 89, formed of lightweight structural elements, which form part of a bed frame structure. Pivotally secured to the trusses 89 are hydraulic or pneumatic actuators 90, 91 which are connected to the legs 83, 84, respectively, near the outer ends thereof. In accordance with the invention, the actuators 90, 91 are relatively elongated and are adapted to have relatively long operating strokes.

In Fig. 18 the apparatus is shown in contracted position, forming a transporter. In this position, the legs 83, 84 are aligned in a horizontal position close to the supporting surface 92, supporting the bed 81 in a similar manner. When the apparatus is used as a transporter, one or both of the actuators 90, 91 act as shock absorbers or pitch dampers to stabilize the aircraft 80 and frame 81 with respect to the undercarriage. This facilitates travel at high speeds and over uneven terrain.

To elevate the apparatus into launching position, the actuators 90, 91 are energized to extend; and the relative proportions of the actuators and the legs 83, 84 are such that the bed 81 will be disposed in inclined relation to the supporting surface 92 when the apparatus is fully elevated.

To facilitate servicing of the aircraft 80, the bed 81 may be tilted downwardly and forwardly from the normal crouched position shown in Fig. 18. This is effected by fully retracting the front actuators 90 to elevate the rear portion of the bed 81 in the manner indicated in Fig. 19. In this position, the aircraft 80 is substantially horizontally disposed so that the motor and other mechanism in the tail portion thereof is readily accessible.

Hydraulic or pneumatic pressure for operating the actuators may be controlled in the manner desired, to effect the raising or tilting of the bed, by means of a suitable manually controlled selector valve (not shown) located conveniently on the legs or frame. Fluid under pressure is supplied from an auxiliary vehicle, or from an emergency hand pump supplied with the launcher apparatus.

The new apparatus, forming a launcher-transporter combine for aircraft, is novel and advantageous in that the parts of the transporter which mount wheels may be quickly moved into an erect position to support an aircraft in launching position. By utilizing the legs as active structural components of the transporter, as well as for launcher supports, the weight of the apparatus is reduced to a minimum. The physical bulk and profile of the apparatus is also thereby reduced to a minimum, so that the launcher-transporter combine, loaded with an aircraft, may be placed on board a standard cargo plane for air shipment over long distances, or towed over the road, through underpasses of ordinary size.

When the apparatus is folded for use as an aircraft transporter or undercarriage, the legs are horizontally disposed and close to the ground, making the center of gravity of the aircraft as low as possible. This facilitates towing of the loaded transporter over uneven terrain. Moreover, the arrangement of the legs and other structural components is such that the undercarriage is flexible, and can bend and twist somewhat to partially absorb road shocks and irregular stresses imposed by uneven terrain.

Since the complete structure of the new launcher-transporter requires a relative minimum of parts, the apparatus may be inexpensively manufactured in volume, making it economically and otherwise practicable to employ a large number of transporters for storing aircraft. In the past, the cost of aircraft launchers has been so high as to make it necessary to use the apparatus solely for the purpose of launching aircraft. This necessitated the use of other storage facilities for the aircraft and required loading of the launchers a short time before launching of the aircraft. It will be readily appreciated that the improved apparatus renders the use of such aircraft substantially more flexible and permits the same to be more quickly placed in operation when and as necessary.

Another important advantage of the new launcher-transporter design resides in the variety of positions which may be assumed by the improved apparatus. Thus, for transporting the aircraft from place to place, either by air or by ground, the apparatus is crouched in the low position in which the undercarriage and aircraft occupy a minimum of space and in which the center of gravity of the aircraft is close to the ground or other supporting surface. For the purpose of fording a small stream, for example, the bed of the apparatus may be elevated and the carriage drawn through the stream on its wheels while supporting the aircraft above the surface of the water. Servicing of the aircraft is also facilitated with the new apparatus since the aircraft is supported close to the ground and may be easily moved to a horizontal position to provide ready access to the tail portion.

We claim:

1. An aircraft launcher-transporter combine comprising an undercarriage having two pairs of oppositely disposed legs, said legs adapted to be position in parallel relation and in angular relation, a bed, the legs of one of said pairs of legs being pivoted for movement with respect to said bed, the legs of the other of said pairs of legs being mounted for slidable movement with respect to said bed, means disposed on said bed adapted to support an aircraft in a position substantially parallel to said legs when said legs are in said parallel relation and to support said aircraft in a position for launching when said legs are in angular relation, actuating means adapted alternatively to move said legs into said angular relation and into said parallel relation, and means for mounting wheels at the four outer ends of said legs.

2. The aircraft launcher-transporter combine of claim 1, further including a bed frame for supporting said bed, and further characterized by the legs of one pair being connected to said bed frame near the front end thereof and extending toward the back end thereof, the legs of the other pair being connected to said bed frame near the back end thereof and extending toward the front end.

3. The aircraft launcher-transporter combine of claim 2, further including means to pivotally connect the legs of one pair to the legs of the other pair, and further characterized by said actuating means acting on the legs of one pair.

4. An aircraft launcher-transport combine comprising an undercarriage having two pairs of oppositely disposed pivoted legs, said legs adapted to be positioned in parallel relation and in angular relation, a bed, means to mount said legs for pivotal movement with respect to said bed so as to form a support therefor, means disposed on said bed adapted to support an aircraft in a position substantially parallel said legs when said legs are in said parallel relation and to support said aircraft in a position for launching when said legs are in angular relation, actuating means connected to certain of said legs and adapted alternatively to move the legs into said angular relation and into said parallel relation, and means for mounting wheels at the outer ends of said legs.

5. The aircraft launcher-transporter combine of claim 4, further including retractable pins for engaging said legs in either said parallel relation or said angular relation to provide a positive lock.

6. An aircraft launcher-transporter combine comprising an undercarriage having two pair of oppositely disposed pivoted legs, said legs adapted to be positioned in parallel relation and in angular relation, a bed, means to mount said legs for pivotal movement with respect to said bed, brace members connected for pivotal movement with respect to said bed at opposite sides thereof and slidably connected to the legs of one of said pairs, means disposed on said bed adapted to support an aircraft in a position substantially parallel said legs when said legs are in said parallel relation and to support said aircraft in a position for launching when said legs are in angular relation, first actuating means connected to said brace members and adapted to pivot said brace members with respect to said bed alternatively to move the said legs of the said one pair into said angular relation and into said parallel relation, second actuating means connected to the legs of the other of said pairs and adapted alternatively to move the legs of the said other pair into said angular relation and into said parallel relation, and means for mounting wheels at the four outer ends of said legs.

7. The aircraft launcher-transporter combine of claim 6, further characterized by said brace members mounting rollers intermediate their ends, the legs connected by said brace members having channels therein for receiving said rollers, said brace members being in a substantially upright position when said legs are in said angular relation and having portions extending downwardly to a supporting surface to provide additional support for said bed.

8. An aircraft launcher-transporter combine comprising an undercarriage having two pairs of oppositely disposed pivoted legs, said legs adapted to be positioned in parallel relation and in angular relation, a bed, means to mount said legs for pivotal movement with respect to said bed, means disposed on said bed adapted to support an aircraft in a position substantially parallel said legs when said legs are in said parallel relation and to support said aircraft in a position for launching when said legs are in angular relation, actuating means separately connected to said legs adapted alternatively to move said legs into said angular relation and into said parallel relation, folding brace means connected to said legs for supporting said legs in angular relation independently of said actuating means, and means for mounting wheels at the four outer ends of said legs.

9. The aircraft launcher-transporter combine of claim 8, further characterized by said folding brace means adapted to support the separate legs of each of said pairs thereof at different angles with respect to said bed whereby said bed is supported at an angle when said legs are in said angular relation.

10. An aircraft launcher-transporter combine comprising an undercarriage having two pairs of oppositely disposed pivoted legs, said legs adapted to be positioned in parallel relation and in angular relation, a bed, means to mount said legs for pivotal movement with respect to said bed, means disposed on said bed adapted to support an aircraft in a position substantially parallel said legs when said legs are in said parallel relation and to support said aircraft in a position for launching when said legs are in angular relation, truss means at the sides of said bed and extending upwardly above said legs, actuating means comprising separate actuators for each of said legs connected to said truss means and to said legs, said actuating means adapted alternatively to move said legs into said angular relation and into said parallel relation and to tilt said bed while said legs are substantially in said parallel relation, and means for mounting wheels at the four outer ends of said legs.

11. An aircraft launcher-transporter combine comprising an undercarriage having two pairs of oppositely disposed pivoted legs, said legs adapted to be positioned in parallel relation and in angular relation, a bed, means to mount said legs for pivotal movement with respect to said bed so as to form a support therefor, means disposed on said bed adapted to support an aircraft in a position substantially parallel said legs when said legs are in said parallel relation and to support said aircraft in a position for launching when said legs are in angular relation, first actuating means connected to certain of said legs and adapted alternatively to move said legs into said angular relation and into said parallel relation, second actuating means connecting certain of said legs and adapted to alter the length thereof, and means for mounting wheels at the outer ends of said legs.

12. An aircraft launcher-transporter combine comprising an undercarriage having two pairs of oppositely disposed pivoted legs, said legs adapted to be positioned in a traveling position disposed substantially horizontally and in a launching position disposed at a relatively large angle to the horizontal, a bed supported by said legs, means on said bed for supporting an aircraft, means to mount the legs of one of said pairs for pivotal movement with respect to said bed, means to mount the legs of the other of said pairs for pivotal movement with respect to the legs of the first pair, actuating means operatively connected with certain of said legs and adapted alternatively to pivot said pairs of legs into said traveling position and into said launching position, means operative upon pivoting of said legs into said launching position to tilt said bed into a position for launching an aircraft, and means for mounting wheels at the outer ends of said legs.

13. The launcher-transporter of claim 12, further including means to extend the length of the legs of one of said pairs.

14. The launcher-transporter of claim 12, further characterized by said means to tilt including brace means extending from the said legs toward said bed and adapted to hold said bed in a tilted position when said legs are in launching position.

15. An aircraft launcher-transporter combine comprising an undercarriage having two pairs of oppositely disposed pivoted legs, said legs adapted to be positioned in a traveling position disposed substantially horizontally and in a launching position disposed at a relatively large angle to the horizontal, a bed, means on said bed for supporting an aircraft, means to mount said legs for pivotal movement with respect to said bed and form a support therefor actuating means operatively connected with certain of said legs and adapted alternatively to pivot said pairs of legs into said traveling position and into said launching position, said means to mount said legs being operative upon pivoting of said legs into said launching position to raise and tilt said bed into a position for launching an aircraft, and means for mounting wheels at the outer ends of said legs.

16. The launcher-transporter combine of claim 15, further characterized by the legs of one of said pairs being mounted for pivotal movement with respect to said bed, and the legs of the other of said pairs being pivotally connected to the legs of the said one pair.

References Cited in the file of this patent

UNITED STATES PATENTS

| | | |
|---|---|---|
| 1,031,818 | Putman | July 9, 1912 |
| 2,355,341 | Trimbach | Aug. 8, 1944 |
| 2,604,014 | Walker et al. | July 22, 1952 |
| 2,735,391 | Buschers | Feb. 21, 1956 |